Aug. 12, 1947.　　　　L. PARKIN　　　　2,425,636
ADJUSTABLE FASTENER STUD
Filed May 22, 1945　　　　2 Sheets-Sheet 1

Inventor
Leslie Parkin.
By Walter S. Jones
Attorney

Aug. 12, 1947.  L. PARKIN  2,425,636
ADJUSTABLE FASTENER STUD
Filed May 22, 1945   2 Sheets-Sheet 2

Inventor
Leslie Parkin.
By Walter S. Jones
Attorney

Patented Aug. 12, 1947

2,425,636

UNITED STATES PATENT OFFICE 2,425,636

ADJUSTABLE FASTENER STUD

Leslie Parkin, Nottingham, England, assignor to United-Carr Fastener Corporation, Cambridge, Mass., a corporation of Massachusetts Application May 22, 1945, Serial No. 595,139

8 Claims. (Cl. 24—221)

The present invention relates to improvements in fastener studs, particularly those of the rotary operative type, which are designed upon partial rotation to engage and lock with a suitable fastener member attached to a support.

More particularly, the invention relates to improvements in the fastener studs of so-called cowling fasteners such as are used for securing aircraft cowling sheets and like structures to supports.

The assembly of rotary fastener stud installations for modern high speed aircraft requires accurate selection of a stud of predetermined length to fit the sockets with which it is to be used in order to lock the cowling parts under the desired tension. Due to many variable factors encountered in manufacture, such as variations in thickness of cowling sheets, distortions and the like, approximately thirty (30) sizes of studs are provided ranging in length from 0.210 inch to 0.480 inch, such effective length being measured from the base of the head to the central axis of the cross pins or radial arms.

In aircraft for use in military operations, replacement of the rotary studs of such rotary fastener installations is often required, and it is not advantageous to maintain such a large assortment of sizes of studs, as above stated, at the field repair stations.

In modern high speed aircraft, air pressure tending to separate the cowling plates is very great with the result that the stud member must be very strong to withstand such tension. As a safety factor such studs are at present tested to withstand a pull of 1000 lbs. before acceptance.

The present invention aims to improve rotary fastener studs of the type above described by the provision of adjustable interthreaded headed and fastener-engaging parts with means providing a positive lock for said parts in selected adjusted positions.

A further object of the invention is the provision of an adjustable fastener stud normally locked against variation in effective length, but which may be manually unlocked to permit adjustment by definite increments of length.

A further object of the invention is the provision of an improved fastener stud which will be of standard size and shape, simple in construction and of adequate strength to withstand the load tests imposed.

Other aims and objects of the invention will be apparent to those skilled in the art from a consideration of the accompanying drawings and annexed specification illustrating and describing one embodiment of the invention.

The fastener stud selected for illustration in the accompanying drawings is one of the type commonly employed in rotary operative types, such as cowling fasteners, though it will be understood that the invention is not restricted to such specific types of fastener studs.

One type of fastener stud commonly employed in cowling fasteners comprises a shank formed with a head at one end and a pair of radial arms adjacent the nose end adapted to engage and lock with a fastener part upon partial rotation of the stud. The radial arms are conveniently provided by a hardened steel cross or transverse pin pressed through the stud nose.

To allow for distortion and bending, as well as variations in thickness of the supporting and cowling sheets, it has been necessary to supply series of studs for each size of fastener. Such series of studs varies in length from the head end to the cross pin so that the user may select the proper length of stud for the particular fastener installation with which it is to be used.

The present invention provides an adjustable length stud member suitable for use as a cowling fastener stud, which will conform to the size and shape of a standard fastener stud but which will be adjustable to fastener secured installations of various depths.

Figure 11:
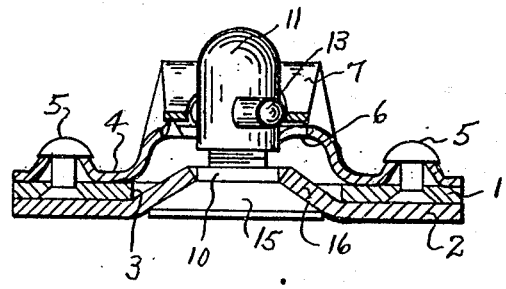
Fig. 11 is a vertical sectional view of a typical fastener secured installation to which the improved stud of the present invention is adapted.

One typical fastener secured installation for which the stud of the present invention is adapted, is illustrated in Fig. 11 and is one form of cowling fastener widely employed for securing together aircraft cowling sheets 1 and 2. The sheet 1 is commonly a supporting plate or part of an aircraft structure and is apertured as at 3 to receive the stud member rotatably mounted in the part to be supported, such as the cowling plate 2. A socket or female fastener member 4 is attached to an opposite face of a support 1, as by rivets 5, and has a raised cam seat 6 adapted to be engaged by the radial arms of the stud upon partial rotation of the latter. The fastener member 4 may include a wing portion 7 overlying the seat 6 to engage the cross pin and may be formed with suitable stop means to limit rotation of the stud. It will be understood that the fastener member 4 may be of any type and construction designed to be engaged by a rotary operative stud, and that the form illustrated in Fig. 11 is but one of many types adaptable to the present invention.

The stud member of the present invention comprises a pair of inter-threaded shank portions 10 and 11, the portion 10 being suitably headed for engagement with the part 2 to be supported and the portion 11 being formed with suitable fastener-engaging or locking means, for example a cross pin 12 providing radially extending arms 13. Other forms of fastener-engaging and locking means may be employed without departing from the spirit of the invention.

Figure 1:
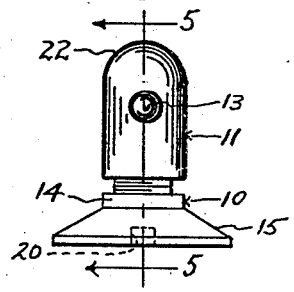
Fig. 1 is an elevation of an adjustable fastener stud embodying the invention and employing one type of head portion.
Figure 2:
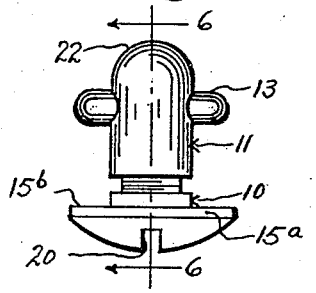
Fig. 2 is an elevation of an adjustable fastener stud embodying the invention and illustrating a modified form of head portion.
Figure 3:
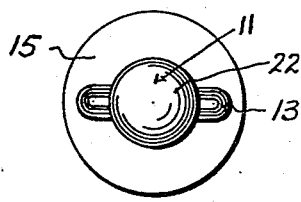
Fig. 3 is a plan view of the fastener stud shown in Fig. 1, as viewed from the stud-nose end.
Figure 4:
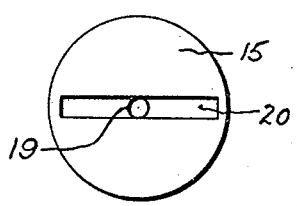
Fig. 4 is a plan view of the fastener stud shown in Fig. 1, as viewed from the head end.
Figure 5:
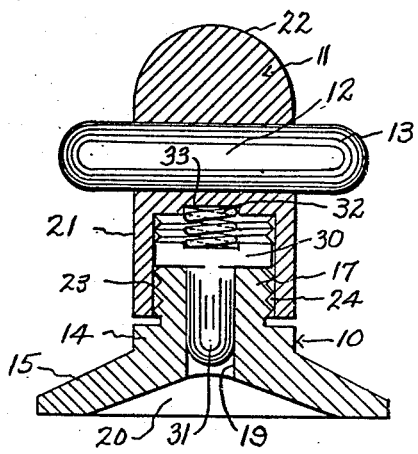
Fig. 5 is an enlarged vertical sectional view of a fastener stud as taken on the line 5—5 of Fig. 1.
Figure 6:
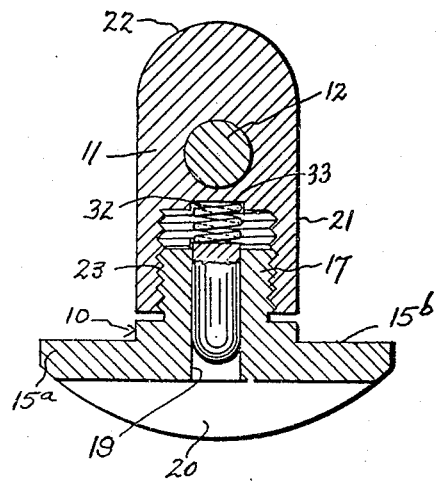
Fig. 6 is an enlarged vertical sectional view of a fastener stud as taken on the line 6—6 of Fig. 2.
Figure 7:
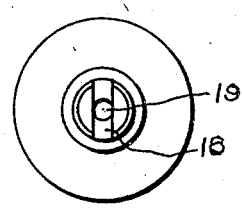
Fig. 7 is an end view of the headed portion only of a fastener stud illustrated in Fig. 5.
Figure 8:
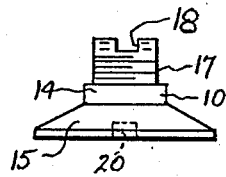
Fig. 8 is an elevation of the headed portion only of a fastener stud illustrated in Fig. 5.
Figure 9:
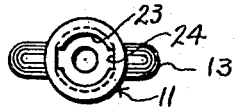
Fig. 9 is an end view of one end of the fastener-engaging portion only of the stud shown in Fig. 5.

The headed portion 10 preferably comprises a shank portion 14 and a suitable head for bearing engagement with a surface of the part 2 to be supported. As illustrated in Figs. 1, 5, 8, and 11, the head 15 is tapered to the shank 14 and is adapted to seat in a dimpled seat 16 in the part 2 (see Fig. 11) so that the outer end of the head may be flush with the outer surface of the part 2. Alternatively, the head 15ª may be rounded or otherwise shaped and have a flat engaging surface 15ᵇ as illustrated in Figs. 2 and 6.

The shank 14 of the headed portion 10 is further formed with a reduced threaded barrel 17 for screw-threaded engagement with the fastener-engaging portion 11. The screw threads may be of any desired pitch or number per inch, but preferably I employ the standard micrometer thread of 40 threads per inch.

The inner end of the barrel 17 may be notched as at 18 to receive a locking member hereinafter described, and the headed portion is centrally bored as at 19, which bore communicates with a transverse slot 20 to receive a suitable tool by means of which the stud may be rotated.

The fastener-engaging portion 11 of the stud may comprise a shank portion 21 having a rounded nose 22 at one end and an internally threaded bore 23 at the other end adapted for threaded engagement with the reduced threaded shank portion 17 of the headed portion 10. The bore 23 preferably has lateral diametrically opposed slots 24, broached for the full depths of the threads to provide guides for the locking means later to be described. The nose end 22 of the portion 11 is, in the illustrated form, provided with a transverse bore into which may be pressed the cross pin 12 providing the radially extending fastener-engaging arms of the stud.

As will be apparent, the fastener-engaging portion 11 of the stud is threaded upon the threaded shank 17 of the headed portion 10 to thus form a complete stud, the effective length of which may be readily adjusted by simply relatively rotating the portions 10 and 11.

The invention provides novel means for normally locking the headed and fastener-engaging portions 10 and 11 against relative rotation, which means are housed within the stud but are accessible for unlocking when it is desired to effect adjustment and change the effective length of the stud. In the illustrated embodiment of the invention a locking key 30 is provided, the ends of which engage in the guide slots 24 so as to be non-rotatably mounted in the stud-engaging portion 11.

Figure 10:
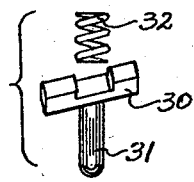
Fig. 10 is a detail perspective view of the locking member for the stud parts of the studs shown in Figs. 5 and 6.

The locking key 30 may, for convenience, be in the form of a T-shaped member (Fig. 10) having a guide stem 31 adapted to be seated in the bore 19 of one of the members 10—11, for example the headed member 10. The head of the T-shaped key 30 is adapted to be seated in the diametric seats 18 of the headed member 10 and the ends thereof are seated nonrotatively in the guide slots 24 of the fastener-engaging portion 11. The key 30 is normally maintained in locking engagement with the seats 18 of the headed portion 10 by a spring member, for example a coil spring 32 positioned in a seat 33 in the key head at the end of the bore 23 of the fastener-engaging portion 11, though obviously other forms of springs may be used.

The fastener-engaging and headed portions 11—10 are normally maintained in locked position by the key 30 which is normally held in the seats 18 by the spring 32. If it is desired to change the effective length of the stud a pronged tool may be inserted in the bore 19 through the head slot 20 to engage the key guide 31 and disengage the key head from the slots 18. The headed and fastener-engaging portions may be thus rotated relative to each other.

Figure 12:
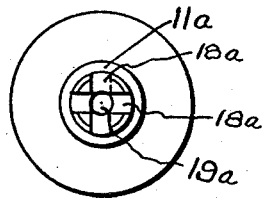
Fig. 12 is an end view of the headed portion, similar to Fig. 7 and illustrating a slightly modified construction.

When the screw threads on the shank portion 17 and bore 23 are cut to 40 threads per inch, one complete rotation of the portion 11 on the headed portion 10 will vary the effective length of the stud twenty-five thousandths of an inch (0.025 inch). When the relative rotation is only one-half turn, the effective length is adjusted .0125 inch. A finer adjustment of .00625 inch may be obtained by providing four radial seats 18ª in the end of the threaded shank portion 17ª, as shown in Fig. 12.

From the above, it will be apparent that the invention provides an improved, simplified, yet strong adjustable stud fastener member, which is normally positively locked against accidental variations in adjustment, but which may be readily unlocked to permit easy variation in the effective length of the stud by definite increments or units of length.

Obviously the invention is not to be restricted to the precise construction shown in the drawings or to the specific thread pitch described, which are intended as illustrative only, as the scope of the invention is best defined in the appended claims.

I claim:

1. A fastener stud member comprising relatively rotatable headed and fastener-engaging parts, and manually releasable means normally locking said parts against rotation in selected positions of definite increments of length, and said headed part having an opening to allow access to said releasable means.

2. A fastener stud comprising a headed part formed with a threaded shank portion, a fastener-engaging part formed with a threaded bore and rotatably mounted upon the threaded shank of the headed portion, and a locking key nonrotatably mounted in one of said parts and normally engaging the other part for locking said parts against rotation in selected adjusted positions and means for manually releasing said locking key from locking engagement with the engaged part.

3. A fastener stud comprising a headed part formed with a threaded shank portion, a fastener-engaging part provided with radial arms and formed with a threaded bore and rotatably mounted upon the threaded shank of the headed portion, and a locking key nonrotatably mounted in one of said parts and normally engaging the other part for locking said parts against rotation in selected adjusted positions, and means for manually releasing said locking key from locking engagement with the engaged part.

4. A fastener stud comprising a headed part provided with a threaded shank, said shank being formed with a central bore, a fastener-engaging part formed with a threaded bore rotatably mounted upon said threaded shank, a locking member nonrotatably mounted in the fastener-engaging part and having a portion extending into the central bore of the headed part, and means for normally urging the locking member into locking engagement with the shank of the headed part.

5. A fastener stud comprising a headed part provided with a threaded shank, said shank being formed with diametric locking seats and a central bore, a fastener-engaging part formed with a threaded bore rotatably mounted upon said threaded shank, a transversely extending locking member nonrotatably mounted in the fastener-engaging part and having a portion extending into the central bore of the headed part, and means for normally urging the locking member into locking engagement with the locking seats of the headed part.

6. A fastener stud comprising a headed part provided with a threaded shank formed with diametrically opposed locking seats, a fastener-engaging part provided with radially extending arms and formed with a threaded bore adapted to be engaged upon the threaded shank of the headed part, a locking key disposed diametrically across said bore and nonrotatable therein, and spring means between said key and the end of the bore for normally maintaining the key in engagement with the seats of the shank of the headed part.

7. A fastener stud comprising a headed part provided with a threaded shank formed with diametrically opposed locking seats, a fastener-engaging part provided with radially extending arms and formed with a threaded bore adapted to be engaged upon the threaded shank of the headed part, a transverse locking bar nonrotatable but axially movable in the bore of said fastener-engaging part, and spring means for normally urging the locking bore into positive locking engagement with said seats.

8. A fastener stud comprising a headed part provided with a threaded shank formed with diametrically opposed locking seats, a fastener-engaging part provided with radially extending arms and formed with a threaded bore adapted to be engaged upon the threaded shank of the headed part, a transverse locking bar nonrotatable but axially movable in the bore of said fastener-engaging part, and spring means for normally urging the locking bore into positive locking engagement with said seats, one of said parts provided with a bore from an outer surface providing access to said locking bar permitting unlocking of the bar from said seats and relative rotation of said headed and fastener-engaging parts.

LESLIE PARKIN.

REFERENCES CITED

The following references are of record in the file of this patent:

UNITED STATES PATENTS

| Number | Name | Date |
| --- | --- | --- |
| 2,095,271 | Swanstrom | Oct. 12, 1937 |
| 2,329,909 | Johnson | Sept. 21, 1943 |
| 2,385,180 | Allen | Sept. 18, 1945 |